Figure 1:
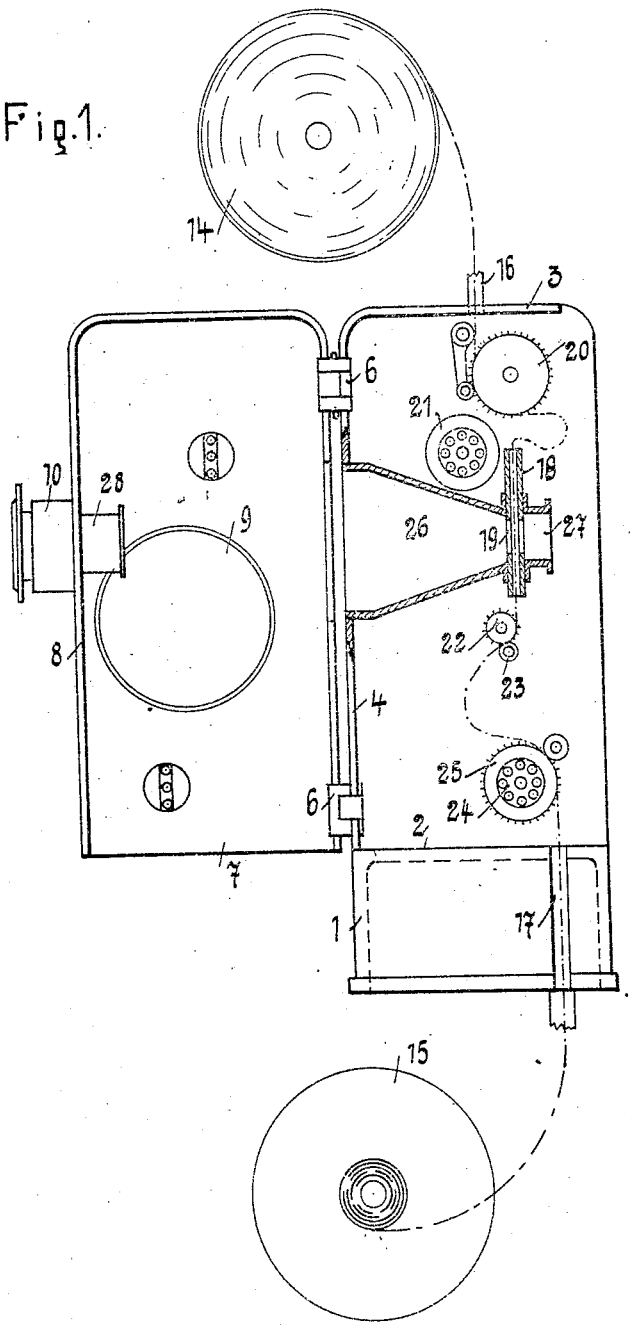

F. M. H. WUNDERLICH.
CINEMATOGRAPH PROJECTOR.
APPLICATION FILED MAR. 20, 1914.

1,162,430.

Patented Nov. 30, 1915.
2 SHEETS—SHEET 2.

UNITED STATES PATENT OFFICE.

FRANZ MAX HERMANN WUNDERLICH, OF DRESDEN-LÖBTAU, GERMANY.

CINEMATOGRAPH-PROJECTOR.

1,162,430.  Specification of Letters Patent.  Patented Nov. 30, 1915.

Application filed March 20, 1914. Serial No. 826,026.

*To all whom it may concern:*

Be it known that I, FRANZ MAX HERMANN WUNDERLICH, a citizen of the Kingdom of Saxony, German Empire, residing in Dresden-Löbtau, in the Kingdom of Saxony, in said Empire, have invented certain new and useful Improvements in Cinematograph-Projectors, of which the following is a specification.

The present invention relates to projectors for cinematographs, in which the film guide and the feed mechanism are incased in a fireproof manner.

The invention in particular consists in improvements by which the safety against danger of fire is further increased.

With the arrangements hitherto employed the film passages from the feeding drum and to the winding drum connect at the top and the bottom to the fireproof casing. Within the undivided interior chamber of the casing the film, however, travels quite free, as far as it is not covered by the flat tubular or sheathlike film guides. Thus a film fire, which generally occurs at the window, cannot strike out of the casing, and can neither reach the film wound on either of the two drums. But the flames will seize that part of the film which is traveling quite open within the casing beyond the film guides. The loss entailed thereby could be borne, as it is only comparatively small and will comprise only a moderate number of pictures, which may be dispensed with for the further use of the film. Much worse, however, it is when the film breaks, and, because of careless attendance, this is not instantly observed. Then the film which is being continuously fed, will collect in serpentine lines in the casing instead of passing straight through it, and these loops of film will be sufficiently long in the proximity of the flames and the heat to be also set afire. The result will be a considerable loss of film length and, under circumstances, it may even lead to an explosion like combustion of large lengths of film entailing danger both for human beings and the premises. If such rupture of the film occurs beneath the window, so that the kinetoscopic picture apparently continues in a regular manner, it will even not be necessary for the operator to be very careless to allow of such choking of the film in the casing to pass unobserved.

A further deficiency in the arrangement hitherto employed consists that the proper closing of the door of the casing, which door has to be opened each time a fresh film is introduced, is not enforced or safeguarded in any way.

It is the object of the present invention to remedy these deficiencies.

On the one hand the range of the window and the path of the rays, within which the inflammation of the film might occur, are separated from the other part of the casing, in which the film travels open and where it may accumulate, by means of partitions. This improvement may be effected in different manners. In each instance the object is to join the rear and front walls of the casing with the film guide all around the window by means of partitions. The most natural form of such partitions is a tubular or funnel shape, in which case a kind of tunnel is carried through the interior chamber. But also horizontal partitions or walls may be arranged above and below the window, extending across the whole width of the casing and thus forming in the said casing an upper admission chamber, a middle chamber open at both sides for the passage of the rays of light, and a lower outlet chamber. This subdivision of the casing may, however, also be obtained by aid of its outer walls, so that instead of one integral casing two completely separate casings, which are connected only by the sheathlike film guide and the necessary parts of the framing, namely one upper or admission casing and one lower or discharge casing and therebetween a free space for the passage of the rays are obtained.

Furthermore the present invention provides that the door of the fireproof casing is made of an angular section, and that the lens is fitted in the front flange of the angle. This arrangement does not only allow of opening a very great part of the works with one single door, but also obliges the operator to really close the casing and keep it closed during the projection, as the lens will be brought into its proper position only by the closing of this door.

Figure 2:
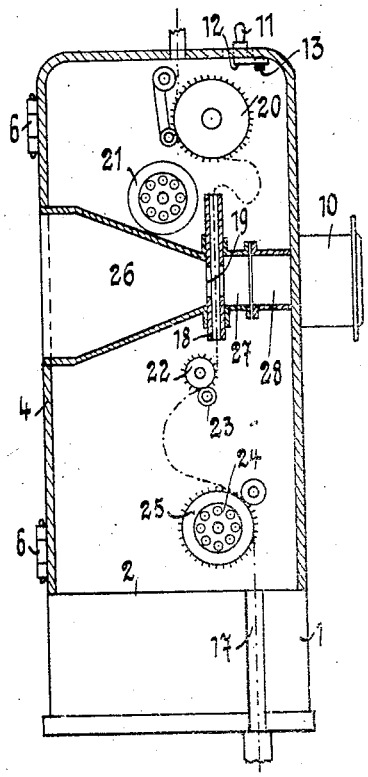
Figure 3:
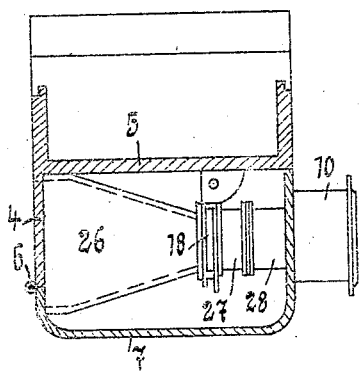

Figures 1–3 of the drawing illustrate a constructional form of the invention. Fig. 1 is a side view with opened door, Fig. 2 is a vertical longitudinal section, and Fig. 3 is a cross section.

The casing which is made of one integral part in this constructional form consists of the base 1 which also forms the bottom 2, the roof 3 and the fixed walls 4 and 5. To the side walls 4 connects the angular door consisting of the walls 7 and 8. The wall 7 contains the inspection window 9 which is covered with glass or mica. In the forward wall 8 the lens 10 is fitted. The door 7—8 is locked by locking means 11, 12, 13 or by any other suitable device. These locking means are preferably so arranged, that they engage automatically as soon as the door is moved into closing position.

Above the casing the film drum 14, and beneath the film drum 15 are arranged. Both drums are connected in a fireproof manner with the roof 3 and the bottom 2 of the casing by means of the sheaths 16 and 17 respectively. Within the casing is arranged the film guide 18 with the window 19. The means for moving the film band are shown in the drawing only as far as it was necessary for explaning the present invention. They do not form a part of the present invention. It may only be said that the parts 20—21 draw the film from the drum 14 and feed it to the guide 18, that the parts 22—23 intermittently advance the film band through the guide 18 and that the parts 24—25 take the film band to the winding drum 15.

The rear wall of the casing is connected with the film guide 18 by means of the tube or funnel 26, through which the light passes to the lens from the condenser lenses, as is customary in these projectors. These condenser lenses are not shown, since they form no part of this invention, and they are not as evident to anyone acquainted to the art. In front the short tube 27 is connected to the film guide 18. A corresponding tube 28 is fitted to the door wall 8 so that, when the door is closed, these two tubes, which are preferably fitted with flanges, as shown in the drawing, will meet. The tubes 26, 27, 28 thus form a tunnel which penetrates the casing and allows of the rays of light passing through, but at the same time separating the passage for the rays from the other part of the casing.

Figure 4:
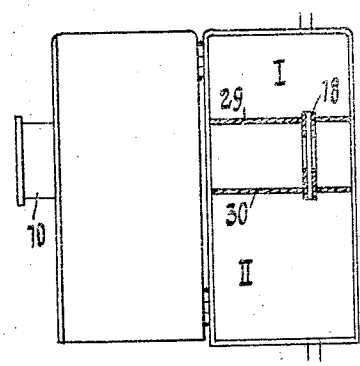

In Fig. 4 a further constructional form is shown in diagram. Here two horizontal intermediate walls 29, 30 are provided in the casing, which, by transsecting the whole depth of the casing, form the two chambers I and II and leave therebetween a space open at back and front, free for the passage of the rays, these walls 29, 30 are connected with each other by the film guide 18.

Figure 5:
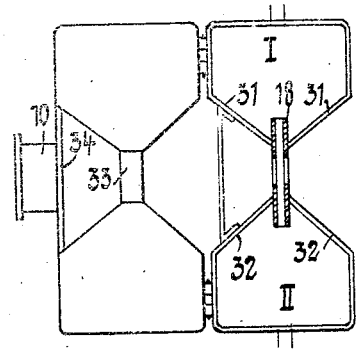

In the third constructional form exemplified in Fig. 5 the angular partitions 31, 32 form the bottom and roof respectively of two completely separate casings I and II, which are connected with each other only by the film guide 18 and the parts of the frame required for journaling the works and other purposes. The door is therefore also made of an according shape, consisting of two plates connected by the bridge 33 and having, in place of a continuous front 8 only the part 34 required for carrying the lens 10.

I claim:

1. In cinematograph projectors, a casing composed of fire-proof material and inclosing the film feeding mechanism, said casing having a door at one side thereof, said door carrying a tube at the front part thereof, the body of said casing containing the film feeding mechanism, and a film-guide behind the front wall of said body, a fire-proof tube in said body connecting with and behind said film-guide, and fire-proof means for connecting the tube in said casing and the tube in said door when said door is closed, so as to form a continuous passage for permitting the passage of the rays of light from the source of light through the said tubes in the said body, and mounted on the said door, the lens being in front of the tube on the said door, said tubes in said body and casing shutting off the place required for showing the individual picture, and for the passage of the rays of light, from the rays of the casing contained in the feeding mechanism.

2. In cinematograph projectors with a casing inclosing the film feeding mechanism in a fireproof manner, and means for shutting off the space required for showing the individual picture and for the passage of the rays of light from the other part of the casing containing the feeding mechanism, a door for closing the projector, said door having an angular section, the projector lens fitted in the forward flange of the said angular door.

3. In cinematograph projectors, a casing inclosing the film feeding mechanism in a fire-proof manner, a door having a forward wall at the front thereof for closing said casing, the projector lens being mounted in casing, the projector wall of the said door, whereby the said forward passage of the rays of light is by the proper passage of the rays of light is secured only when the said door is firmly closed.

In testimony that I claim the foregoing as my invention, I have signed my name in presence of two subscribing witnesses.

FRANZ MAX HERMANN WUNDERLICH.

Witnesses:
PAUL ARRAS,
GUSTAV MÜLLER.